United States Patent [19]
Takeuchi et al.

[11] Patent Number: 5,667,910
[45] Date of Patent: Sep. 16, 1997

[54] ELECTROCHEMICAL CELL HAVING A CATHODE COMPRISING DIFFERING ACTIVE FORMULATIONS AND METHOD

[75] Inventors: Esther S. Takeuchi, East Amherst; Sally Ann Smesko, North Tonawanda, both of N.Y.

[73] Assignee: Wilson Greatbatch Ltd., Clarence, N.Y.

[21] Appl. No.: 628,568

[22] Filed: Apr. 3, 1996

[51] Int. Cl.$^6$ .................................................. H01M 4/62
[52] U.S. Cl. ......................... 429/128; 429/209; 429/232
[58] Field of Search .............................. 429/128, 209, 429/218, 232

[56] References Cited

U.S. PATENT DOCUMENTS

| | | |
|---|---|---|
| 3,476,610 | 11/1969 | Krebs et al. ........................ 429/218 X |
| 3,565,694 | 2/1971 | Chireau ............................. 136/121 |
| 4,233,375 | 11/1980 | Whittingham et al. ............. 429/218 X |
| 4,259,415 | 3/1981 | Tamura et al. .................... 429/218 X |
| 4,294,893 | 10/1981 | Iemmi et al. ..................... 429/42 |
| 4,324,828 | 4/1982 | Ebato et al. ...................... 429/209 |
| 4,654,281 | 3/1987 | Anderman et al. ................. 429/209 |
| 5,180,642 | 1/1993 | Weiss et al. ...................... 429/218 X |

*Primary Examiner*—Stephen Kalafut
*Attorney, Agent, or Firm*—Hodgson, Russ, Andrews, Woods & Goodyear LLP

[57] ABSTRACT

An alkali metal electrochemical cell having the cathode comprising at least two distinct active mixtures having differing formulations of a discharge promoter component mixed with electrode active material, is described. The active mixture contacting the current collector has a greater percentage of the discharge promoter component than the remainder of the cathode, and a preferred electrode active material is fluorinated carbon.

43 Claims, 11 Drawing Sheets

ELECTROCHEMICAL CELL HAVING A CATHODE COMPRISING DIFFERING ACTIVE FORMULATIONS AND METHOD

BACKGROUND OF THE INVENTION

1. Field of the Invention

The present invention generally relates to the conversion of chemical energy to electrical energy and, more particularly, to an electrochemical cell wherein one of the electrodes comprises at least two distinct active formulations, each comprised of a discharge promoter component mixed with at least one electrode active material but in differing formulations. Preferably the electrode having the distinct active formulations is the cathode in a primary electrochemical cell.

2. Prior Art

It is known to provide cathodes formed from layers having differing formulations of electrode active materials. Examples of this include U.S. Pat. No. 4,294,893 to Iemmi et al., which discloses a composite graphite-resin porous electrode structure comprising powdered graphite (and other forms of electrically-conductive carbon, such as acetylene black), resin monomer and a catalyst. The composite structure may be in the form of two layers having different pore sizes. This cell is applicable to use in fuel cells having acid electrolytes wherein the provision of two layers, the pores of one layer being of a different size than the pores of the other layer, allows the catalyst to concentrate in one of the layers or in the zone of contact between them thus achieving a high concentration of catalyst at the site of the electrode reaction, in use.

U.S. Pat. No. 3,565,694 to Chireau is directed to a bipolar electrode comprising two distinct polymeric coatings on a sheet of zinc or other metal. The adhesive inner coating is of isobutylene polymer or copolymer and the outer coating is of ethylene/vinylacetate copolymer. Both coatings include relatively fine particles of carbon black (preferably acetylene black) and relatively coarse particles of graphite or electrolyte-insoluble metal to reduce their resistance and to serve as the electropositive active material.

In contrast to the composite structures and the distinct active coatings described by the prior art, the present invention is directed to increasing the discharge efficiency of an electrochemical cell by using a relatively small amount of a first electrode active formulation comprising a discharge promoter component mixed with at least one electrode active material in contact with a current collector and, a second electrode active formulation contacting the first formulation and having a lesser amount of the discharge promoter component mixed with an increased amount of the at least one electrode active material. In the case of a Li/CF$_x$ cell having at least two distinct active formulations according to the present invention including a carbonaceous diluent as the discharge promoter component, increased delivered capacities of almost 2% to 5% under a heavy drain rate have been realized.

SUMMARY OF THE INVENTION

The present invention is directed to an electrochemical cell having one of the electrodes comprising at least two distinct mixtures or formulations of at least one electrode active material. An exemplary form of the present invention is an alkali metal electrochemical cell with the cathode comprising at least two distinct formulations. In that respect, a first formulation having a discharge promoter component admixed with at least one electrode active material is placed in contact with a current collector. A second formulation having a lesser percentage of the discharge promoter than is present in the first formulation is mixed with at least one electrode active material present in a greater percentage than in the first formulation and the second formulation is placed in contact with the first formulation. The distinct layers of electrode active formulations do not merely act to form a single electrode of the averaged formulation. Instead, it is believed that the inner active formulation having the greater percentage of the discharge promoter component but the lesser percentage of the electrode active material provides the necessary conductivity for the discharge to progress effectively.

These and other aspects of the present invention will become more apparent to those skilled in the art by reference to the following description and to the appended drawings.

DETAILED DESCRIPTION OF THE INVENTION

The electrochemical cell of the present invention comprises an anode of a metal selected from Group IA of the Periodic Table of the Elements, including lithium, sodium, potassium, etc., and their alloys and intermetallic compounds including, for example, Li-Si, Li-Al, Li-Mg, Li-Al-Mg, Li-B and Li-Si-B alloys and intermetallic compounds. The form of the anode may vary, but typically, it is made as a thin sheet or foil of the anode metal, and a current collector having an extended tab or lead affixed to the anode sheet or foil.

The electrochemical cell preferably comprises a solid cathode having active material including, but not limited to, manganese dioxide, copper silver vanadium oxide, silver vanadium oxide, copper vanadium oxide, titanium disulfide, copper oxide, copper sulfide, iron sulfide, iron disulfide and fluorinated carbon, and mixtures thereof. Preferably, a first portion of the cathode comprises between about 80% to about 94%, by weight, of the cathode active material placed in contact with a cathodic current collector while the remainder portion of the cathode comprises the cathode active material in a range of between about 95% to about 98%, by weight, and placed in contact with the first cathode portion.

In the case of the cathode active formulations of the present invention comprising a carbonaceous active material, the carbonaceous material preferably is prepared from carbon and fluorine, and includes graphitic and non-graphitic forms of carbon, such as coke, charcoal or activated carbon. The fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely. The preferred cathode active mixture comprises $CF_x$ combined with a discharge promoter component such as acetylene black, carbon black and/or graphite. Metallic powders such as nickel, aluminum, titanium and stainless steel in powder form are also useful as conductive diluents when mixed with the cathode active mixture of the present invention. If required, a binder material can also be used. Preferred binders comprise fluoro-resins in powdered form such as powdered polytetrafluoroethylene (PTFE).

Exemplary fluorinated carbon cathode formulations include the following:

1) 91% active $CF_x$ mixture comprising, by weight, 91% $CF_x$, 5% carbon black and 4% PTFE binder;
2) 95% active $CF_x$ mixture comprising, by weight, 95% $CF_x$, 4% carbon black and 1% PTFE binder; and
3) 98% active $CF_x$ mixture comprising, by weight, 98% $CF_x$, 1% carbon black and 1% PTFE binder.

In one embodiment of the present invention, a first portion of the cathode comprises the 91% active $CF_x$ mixture placed in contact with a cathodic current collector while the remainder portion of the cathode comprises the 95% active $CF_x$ mixture in contact with the 91% active $CF_x$ mixture. In a second exemplary embodiment of the present invention, the 95% active $CF_x$ mixture is replaced with the 98% active $CF_x$ mixture. The combination of these mixtures does not merely act to form a single, average cathode formulation, but rather the cathode depolarizer contacting the current collector is utilized first and intercalation is believed to proceed outwardly from the inside of the cathode.

It should be understood by those skilled in the art that the above $CF_x$ active formulations are exemplary and that other $CF_x$ active formulations are contemplated by the scope of the present invention. What is important is that the first active $CF_x$ formulation contacting the current collector has a greater amount of the discharge promoter component than the remaining portion of the cathode. Likewise, the distinct formulations of the present invention are equally applicable to promote increased discharge efficiency with the other active materials enumerated above such as the solid cathode/electrolyte systems including, for example, the Li/SVO system. Again, what is important according to the present invention is that whatever the active material, or combinations thereof, that the formulation contacting the current collector has a greater percentage of a discharge promoter component than the remainder of the cathode.

Cathode components for incorporation into a cell according to the present invention may be prepared by rolling, spreading or pressing the respective cathode active formulations including the distinct mixtures of the discharge promoter component or conductive diluents and one or more of the above listed electrode active materials onto a current collector with the aid of a binder material. Preferred binder materials include a powdered fluoro-resin such as powdered polytetrafluoroethylene (PTFE). Suitable current collectors are comprised of a conductive metal such as titanium, nickel, aluminum and stainless steel. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA anode material by a suitable separator material. The separator is of electrically insulative material and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include fabrics woven from fluoropolymeric fibers including polyvinylidine fluoride, tetrafluoroethylene-ethylene copolymer (PETFE), and chlorotrifluoroethylene-ethylene copolymer. Fabrics woven from these fluoropolymeric fibers can be used either alone or laminated with a fluoropolymeric microporous film. Other suitable separator materials include non-woven glass polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably the ion-forming alkali metal salt is similar to the alkali metal comprising the anode.

In a solid cathode/electrolyte system, the ionically conductive salt preferably has the general formula $MM'F_6$ or $MM'F_4$ wherein M is an alkali metal similar to the alkali metal comprising the anode and M' is an element selected from the group consisting of phosphorous, arsenic, antimony and boron. Examples of salts yielding $M'F_6$ are: hexafluorophosphate ($PF_6$), hexafluoroarsenate ($AsF_6$) and hexafluoroantimonate ($SbF_6$), while tetrafluoroborate ($BF_4$) is exemplary of salts yielding $M'F_4$. Alternatively, the corresponding sodium or potassium salts may be used. Other inorganic salts useful with the present invention include $LiClO_4$, $LiAlCl_4$, $LiGaCl_4$, $LiC(SO_2CF_3)_3$, $LiN(SO_2CF_3)_2$ and $LiCF_3SO_3$, and mixtures thereof.

Low viscosity solvents include tetrahydrofuran (THF), methyl acetate (MA), diglyme, trigylme, tetragylme, dimethyl carbonate (DMC), 1,2-dimethoxyethane (DME), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the present invention, the preferred anode is lithium metal and the preferred electrolyte is 1.0M to 1.4M LiBF$_4$ in γ-butyrolactone (GBL).

The preferred form of the electrochemical cell is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, nickel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Prismatic Li/CF$_x$ cells of a central cathode design were used as exemplary test vehicles. The exemplary cells were constructed having cathodes weighing about 3.15 grams each, as shown in Table 1. Three cathode mixture formulations were used. In particular, a first group of test cells was built, designated as Cell Nos. 96048, 96049 and 96050 in Table 1, each cell having a cathode comprising a 91% active CF$_x$ mixture of, by weight, 91% CF$_x$, 5% carbon black, and 4% PTFE binder. A second group of test cells was built, designated as Cell Nos. 96051, 96052 and 96053 in Table 1, each cell having a cathode comprising a 95% active CF$_x$ mixture of, by weight, 95% CF$_x$, 4% carbon black, and 1% PTFE binder. And, a third group of test cells was built, designated as Cell Nos. 96054, 96055 and 96056 in Table 1, each cell having a cathode comprising a 98% active CF$_x$ mixture of, by weight, 98% CF$_x$, 1% carbon black, and 1% PTFE binder.

Lithium excess was kept constant between cells and the weight and percent excess for each cell are indicated in Table 1. Titanium screens served as the cathodic current collectors, while the lithium was pressed to nickel screens. The cathodes were each heat-sealed in a non-woven polypropylene separator bag and the electrode stack was housed in a titanium casing activated with an electrolyte comprising 1.0M lithium tetrafluoroborate in gamma-butyrolactone.

TABLE 1

| Ser. number | g 91% active mix | Other depolarizer used | g used other depolarizer | g Li | % Li excess | g electrolyte | Theoretical capacity, Ah | Capacity to 2 V, Ah |
|---|---|---|---|---|---|---|---|---|
| 96048 | 3.152 | | | 0.740 | 16 | 3.78 | 2.47 | 2.170 |
| 96049 | 3.145 | | | 0.744 | 17 | 3.79 | 2.46 | 2.075 |
| 96050 | 3.146 | | | 0.743 | 16 | 3.81 | 2.46 | 2.112 |
| 96051 | | 95% | 3.143 | 0.771 | 16 | 3.72 | 2.57 | 1.982 |
| 96052 | | 95% | 3.149 | 0.772 | 16 | 3.80 | 2.57 | 2.325 |
| 96053 | | 95% | 3.142 | 0.771 | 16 | 3.94 | 2.57 | 2.234 |
| 96054 | | 98% | 3.172 | 0.804 | 16 | 3.95 | 2.67 | 2.024 |
| 96055 | | 98% | 3.147 | 0.804 | 17 | 3.94 | 2.65 | 2.018 |
| 96056 | | 98% | 3.155 | 0.800 | 16 | 3.80 | 2.66 | 1.925 |

All test cells in this example were preconditioned at 37° C. by discharge under a 1.5 kohm load for a period of 18 hours. Then, after a one week open circuit storage period at 37° C., a pulse train was applied to each cell at 37° C. The pulse train consisted of four 20 mA current pulses applied for 10 seconds with a 15 second rest between each pulse. The cells were then discharged at 37° C. under 1 kohm loads. Closed circuit voltage and 1 kHz impedance readings were recorded daily throughout run-down. In addition, approximately every ten days, the discharge loads were removed. At this time, the AC impedance spectra of the cells were recorded, a 20 mA pulse train (as described above) was again applied to each cell, and cell thickness was recorded. After these data were recorded, the 1 kohm resistors were reattached and cell discharge continued.

Figure 1:
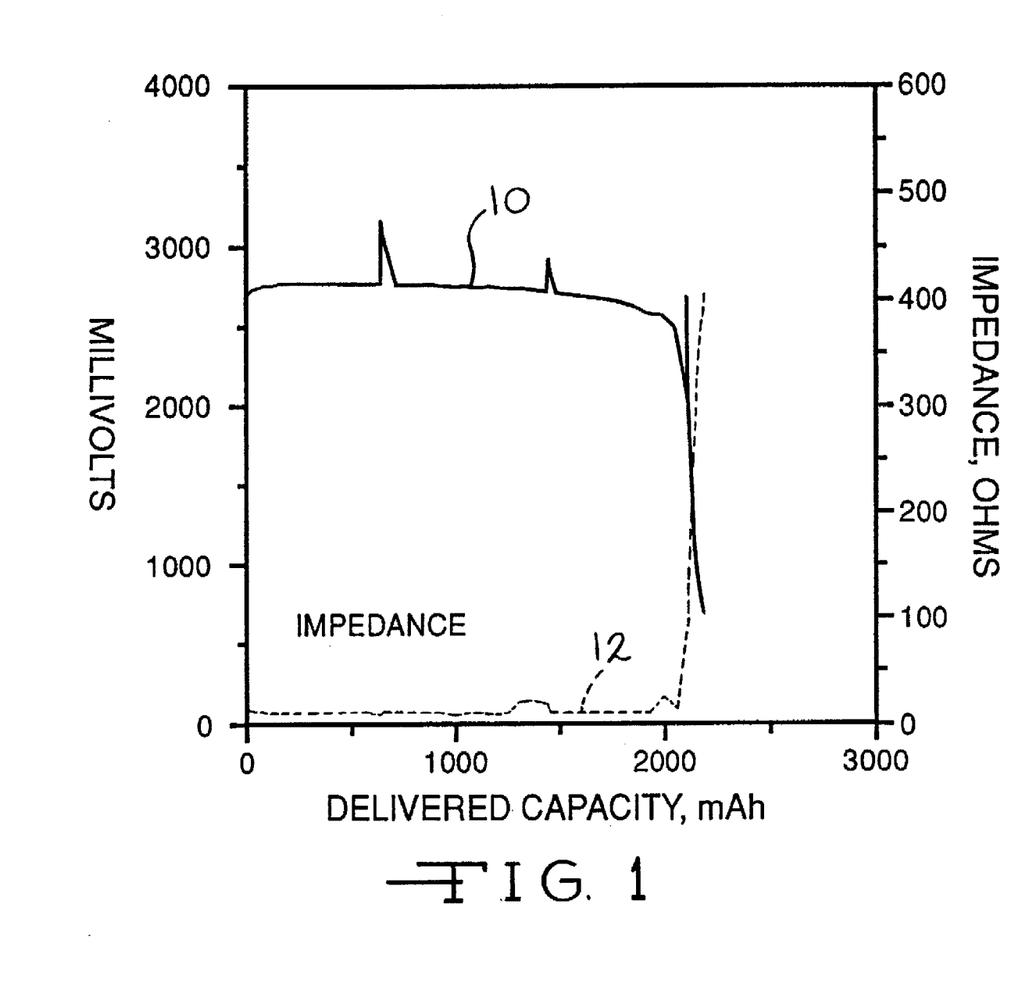
FIG. 1 is a graph constructed from the average discharge of three Li/CF$_x$ test cells having a 91% active CF$_x$ mixture contacting a titanium current collector.
Figure 2:
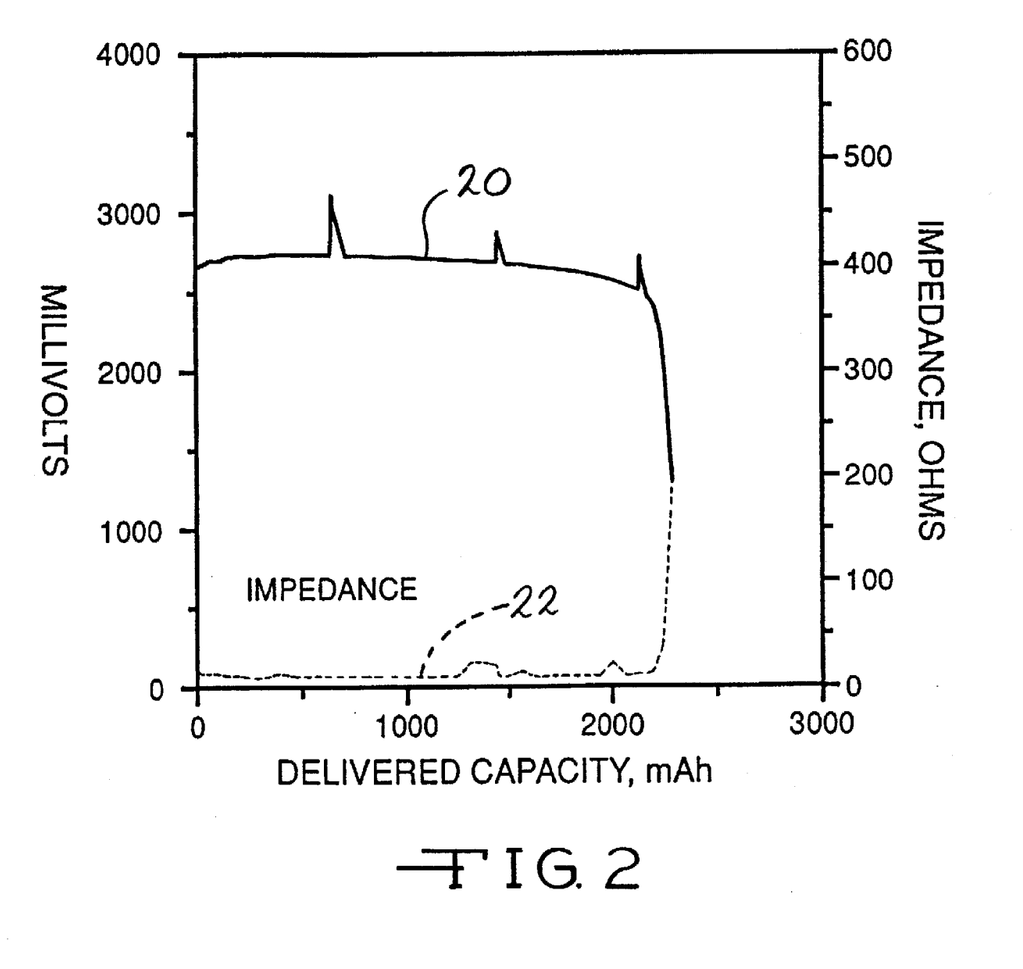
FIG. 2 is a graph constructed from the average discharge of three Li/CF$_x$ test cells having a 95% active C$_x$ mixture contacting a titanium current collector.
Figure 3:
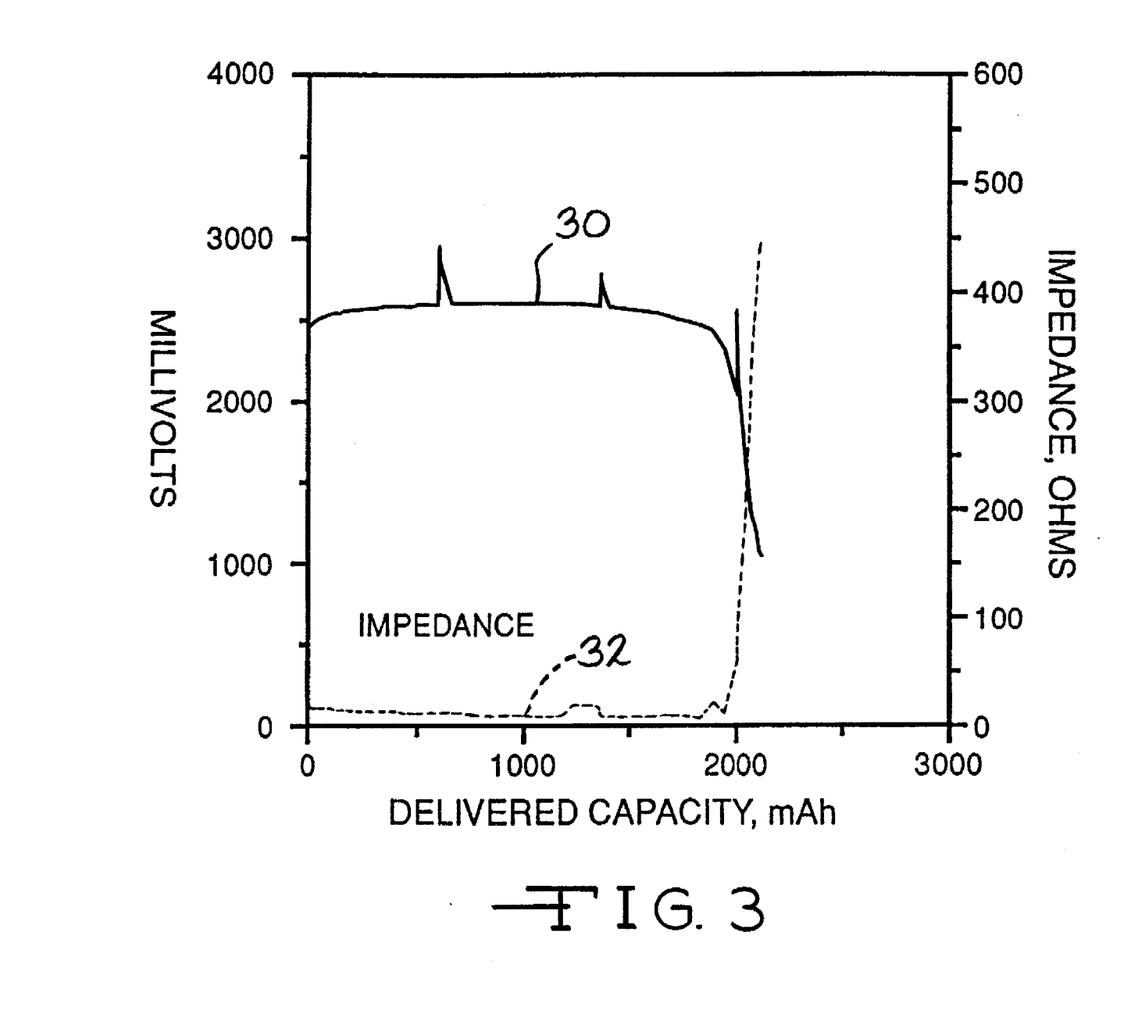
FIG. 3 is a graph constructed from the average discharge of three Li/CF$_x$ test cells having a 98% active CF$_x$ mixture contacting a titanium current collector.

The average discharge profiles of the three test cell groups are shown in FIGS. 1 to 3, respectively. In FIG. 1, curve 10 was constructed from the average discharge of the first group of cells having the cathode comprising the 91% active CF$_x$ mixture and curve 12 was constructed from the average impedance of this group of cells. In FIG. 2, curve 20 was constructed from the average discharge of the second group of test cells having the cathode comprising the 95% active CF$_x$ mixture and curve 22 was constructed from the average impedance of this group of cells. In FIG. 3, curve 30 was constructed from the average discharge of the third group of test cells having the cathode comprising the 98% active CF$_x$ mixture and curve 32 was constructed from the average impedance of this group of cells.

As can be seen, the discharge voltages decreased as the percent of the discharge promoter component, i.e., carbon black, decreased and the percentage of the CF$_x$ active material in the various mixture formulations increased.

EXAMPLE II

To test the improved discharge efficiency of the exemplary cells constructed having distinct portions of active formulations according to the present invention, sandwich cathodes composed of the 91% and the 98% active $CF_x$ mixtures were pressed as follows: 1.26 grams of the 91% active $CF_x$ mixture was placed in contact with each side of the titanium cathodic current collector of three test cells. The remainder of the cathode, 0.6 grams, was composed of the 98% active $CF_x$ mixture, as shown in Table 2. In the other three test cells in this example listed in Table 3, the weights of the two cathode components/active depolarizer mixtures remained the same, however their juxtaposition to the current collector were reversed. In all other respects, the test cells used in this example were similar to those constructed as described in Example I.

In particular, a fourth group of three test cells, designated as Cell Nos. 93749, 93751 and 93752 in Table 2, was built having cathodes comprised of 1.26 grams of the 91% active $CF_x$ mixture of, by weight, 91% $CF_x$, 5% carbon black, and 4% PTFE binder placed in contact with each side of a titanium cathode current collector, and having 0.6 grams of the 98% active $CF_x$ material of, by weight, 98% $CF_x$, 1% carbon black, and 1% PTFE binder in contact with the 91% active $CF_x$ mixture. A fifth group of three test cells, designated as Cell Nos. 93744, 93745 and 93747 in Table 3, was built having cathodes comprised of 0.6 grams of the 98% active $CF_x$ mixture placed in contact with each side of a titanium cathode current collector, and 1.26 grams of the 91% active $CF_x$ mixture placed in contact with the 98% active $CF_x$ mixture.

was determined that the two cathode/depolarizer mixtures do not merely act to form a single cathode of the average formulation, i.e., 92.3% $CF_x$, 3.4% binder, and 4.2% carbon black. Instead, the placement of the 91% active $CF_x$ mixture in contact with the current collector screen results in a markedly different discharge profile.

EXAMPLE III

In order to determine the minimum amount of depolarizer comprised of, by weight, the 91% active $CF_x$ mixture as the first formulation required to be in contact with the current collector screen to promote the more efficient discharge of the second, depolarizer formulation having a lesser percentage of the discharge promoter component but a greater percentage of active material than the first formulation, additional Li/$CF_x$ cells having cathodes comprising various active formulations according to the present invention were constructed, as set forth in Table 4. In all other respects the test cells used in this example were similar in their construction to those built in Example I. As listed in Table 4, four cathode mixture formulations were used in the construction of these cells. In particular, a sixth group of cells, designated as Cell Nos. 96057, 96058 and 96059 in Table 4, was built. Each of these cells had a cathode comprising 0.6 grams of the 91% active $CF_x$ mixture of, by weight, 91% $CF_x$, 5% carbon black, and 4% PTFE binder placed in contact with a titanium current collector and 2.55 grams of the 95% active $CF_x$ mixture of, by weight, 95% $CF_x$, 4%

TABLE 2

| Ser. number | g 91% active mix | Other depolarizer used | g used other depolarizer | g Li | % Li excess | g electrolyte | Theoretical capacity, Ah | Capacity to 2 V, Ah |
| --- | --- | --- | --- | --- | --- | --- | --- | --- |
| 93749 | 2.52 | 98% | 0.6 | 0.740 | 15 | 3.76 | 2.48 | 2.219 |
| 93751 | 2.52 | 98% | 0.6 | 0.740 | 15 | 3.80 | 2.48 | 2.215 |
| 93752 | 2.52 | 98% | 0.6 | 0.740 | 15 | 3.79 | 2.48 | 2.222 |

TABLE 3

| Ser. number | g 91% active mix | Other depolarizer used | g used other depolarizer | g Li | % Li excess | g electrolyte | Theoretical capacity, Ah | Capacity to 2 V, Ah |
| --- | --- | --- | --- | --- | --- | --- | --- | --- |
| 93744 | 0.6 | 91% | 2.52 | 0.740 | 15 | 3.76 | 2.48 | 2.172 |
| 93745 | 0.6 | 91% | 2.52 | 0.740 | 15 | 3.74 | 2.48 | 2.177 |
| 93747 | 0.6 | 91% | 2.52 | 0.740 | 15 | 3.75 | 2.48 | 2.170 |

Figure 4:
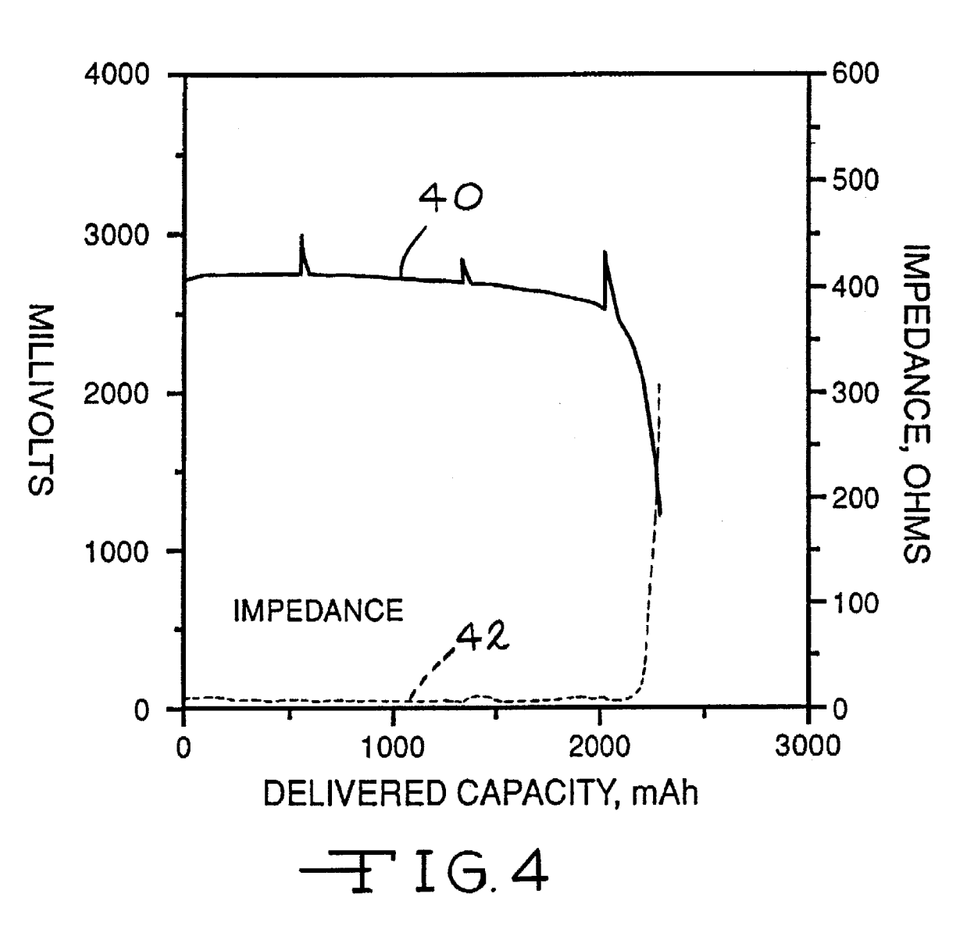
FIG. 4 is a graph constructed from the average discharge of three Li/CF$_x$ test cells having a first, 91% active CF$_x$ mixture contacting a titanium current collector and a second, 98% active CF$_x$ mixture contacting the first active mixture.
Figure 5:
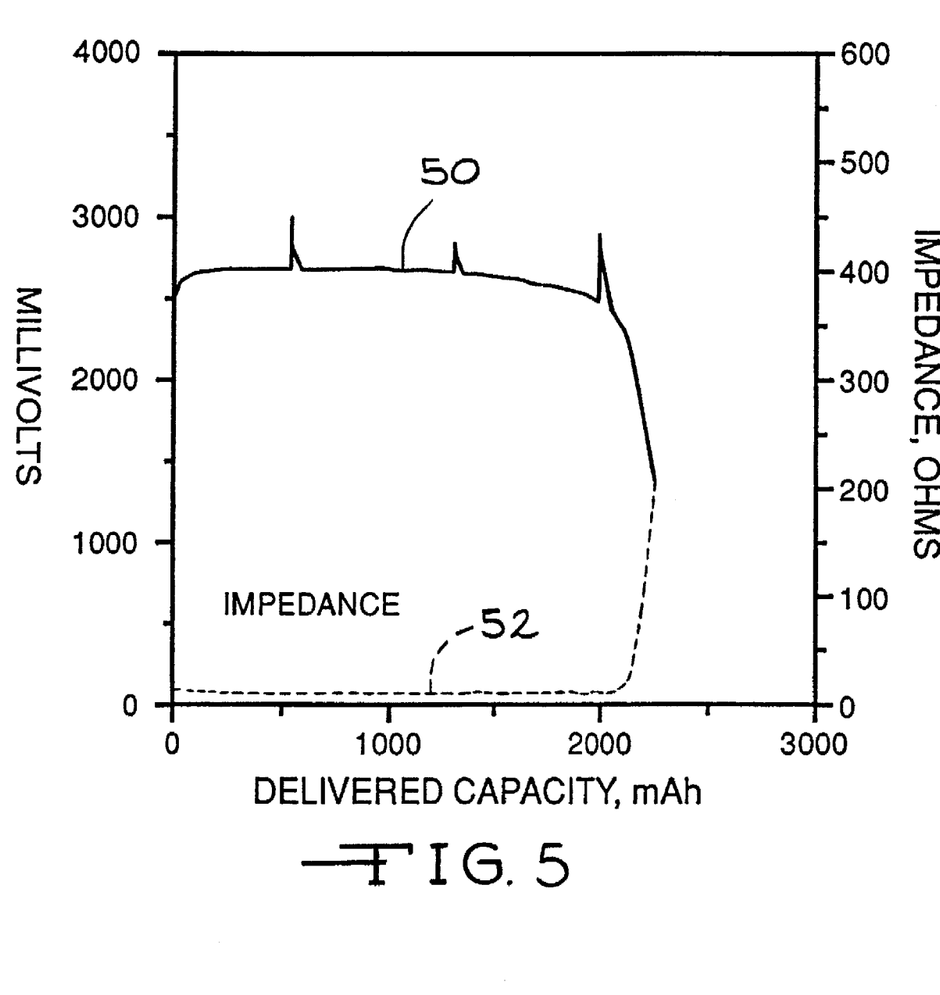
FIG. 5 is a graph constructed from the average discharge of three Li/CF$_x$ test cells having a first, 98% active CF$_x$ mixture contacting a titanium current collector and a second, 91% active CF$_x$ mixture contacting the first active mixture.

All of the test cells in this example were preconditioned and then discharged according to a similar discharge protocol as that used to discharge the various test cells in Example I. The average discharge profiles of the respective cell groups in this example are shown in FIGS. 4 and 5, respectively. In FIG. 4, curve 40 was constructed from the average discharge of the fourth cell group having the 91% active $CF_x$ mixture in contact with the current collector and curve 42 was constructed from the average impedance of this group of cells. In FIG. 5, curve 50 was constructed from the average discharge of the fifth cell group having the 98% active $CF_x$ mixture in contact with the current collector and curve 52 was constructed from the average impedance of this group of cells.

As shown Tables 2 and 3 and in FIGS. 4 and 5, the cells in which the 91% active $CF_x$ mixture was pressed into contact with the titanium current collector screens had increased discharge voltages and greater delivered capacities in comparison to the cells having the 98% active $CF_x$ mixture contacting the current collector. From this data, it carbon black, and 1% PTFE binder placed in contact with the 91% active $CF_x$ mixture to give a total cathode weight of 3.15 grams.

A seventh group of cells, designated as Cell Nos. 96060, 96061 and 96062 in Table 4, was built, each having a cathode comprising 0.6 grams of the 91% active $CF_x$ mixture in contact with a titanium current collector and 2.55 grams of the 98% active $CF_x$ mixture of, by weight, 98% $CF_x$, 1% carbon black, and 1% PTFE binder in contact with the 91% active $CF_x$ mixture.

An eighth group of cells, designated as Cell Nos. 96063, 96064 and 96065 in Table 4, was constructed, each having a cathode comprising 0.3 grams of the 91% active $CF_x$ mixture in contact with a titanium current collector and 2.85 grams of the 95% active $CF_x$ mixture in contact with the 91% active $CF_x$ mixture.

TABLE 4

| Ser. number | g 91% active mix | Other depolarizer used | g used other depolarizer | g Li | % Li excess | g electrolyte | Theoretical capacity, Ah | Capacity to 2 V, Ah |
|---|---|---|---|---|---|---|---|---|
| 96057 | 0.6 | 95% | 2.55 | 0.772 | 17 | 3.93 | 2.55 | 2.251 |
| 96058 | 0.6 | 95% | 2.55 | 0.770 | 16 | 3.81 | 2.55 | 2.143 |
| 96059 | 0.6 | 95% | 2.55 | 0.769 | 16 | 3.93 | 2.55 | 2.258 |
| 96060 | 0.6 | 98% | 2.55 | 0.803 | 18 | 3.92 | 2.62 | 2.058 |
| 96061 | 0.6 | 98% | 2.55 | 0.801 | 18 | 3.92 | 2.62 | 2.051 |
| 96062 | 0.6 | 98% | 2.55 | 0.800 | 18 | 3.95 | 2.62 | 2.076 |
| 96063 | 0.3 | 95% | 2.85 | 0.770 | 16 | 3.93 | 2.56 | 2.226 |
| 96064 | 0.3 | 95% | 2.85 | 0.774 | 17 | 3.94 | 2.56 | 2.247 |
| 96065 | 0.3 | 95% | 2.85 | 0.773 | 16 | 3.83 | 2.56 | 2.152 |
| 96066 | 0.3 | 98% | 2.85 | 0.792 | 16 | 3.94 | 2.64 | 2.061 |
| 96067 | 0.3 | 98% | 2.85 | 0.794 | 16 | 3.86 | 2.64 | 1.990 |
| 96068 | 0.3 | 98% | 2.85 | 0.793 | 16 | 3.95 | 2.64 | 2.076 |
| 96069 | 0.9 | 95% | 2.25 | 0.760 | 15 | 3.75 | 2.54 | 2.092 |
| 96070 | 0.9 | 95% | 2.25 | 0.763 | 16 | 3.94 | 2.54 | 2.241 |
| 96071 | 0.9 | 95% | 2.25 | 0.763 | 16 | 3.80 | 2.54 | 2.165 |
| 96072 | 0.9 | 98% | 2.25 | 0.783 | 16 | 3.79 | 2.60 | 1.974 |
| 96073 | 0.9 | 98% | 2.25 | 0.780 | 16 | 3.90 | 2.60 | 2.069 |
| 96074 | 0.9 | 98% | 2.25 | 0.784 | 16 | 3.93 | 2.60 | 2.098 |

A ninth group of cells, designated as Cell Nos. 96066, 96067 and 96068 in Table 4, was built, each having a cathode comprising 0.3 grams of the 91% active $CF_x$ mixture in contact with a titanium current collector and 2.85 grams of the 98% active $CF_x$ mixture in contact with the 91% active $CF_x$ mixture.

A tenth group of cells, designated as Cell Nos. 96069, 96070 and 96071 in Table 4, was built, each having a cathode comprising 0.9 grams of the 91% active $CF_x$ mixture in contact with a titanium current collector and 2.55 grams of the 95% active $CF_x$ mixture in contact with the 91% active $CF_x$ mixture.

Finally, an eleventh group of cells, designated as Cell Nos. 96072, 96073 and 96074 in Table 4, was built, each having a cathode comprising 0.9 grams of the 91% active $CF_x$ mixture in contact with a titanium current collector and 2.55 grams of the 98% active $CF_x$ mixture in contact with the 91% active $CF_x$ mixture.

Figure 6:
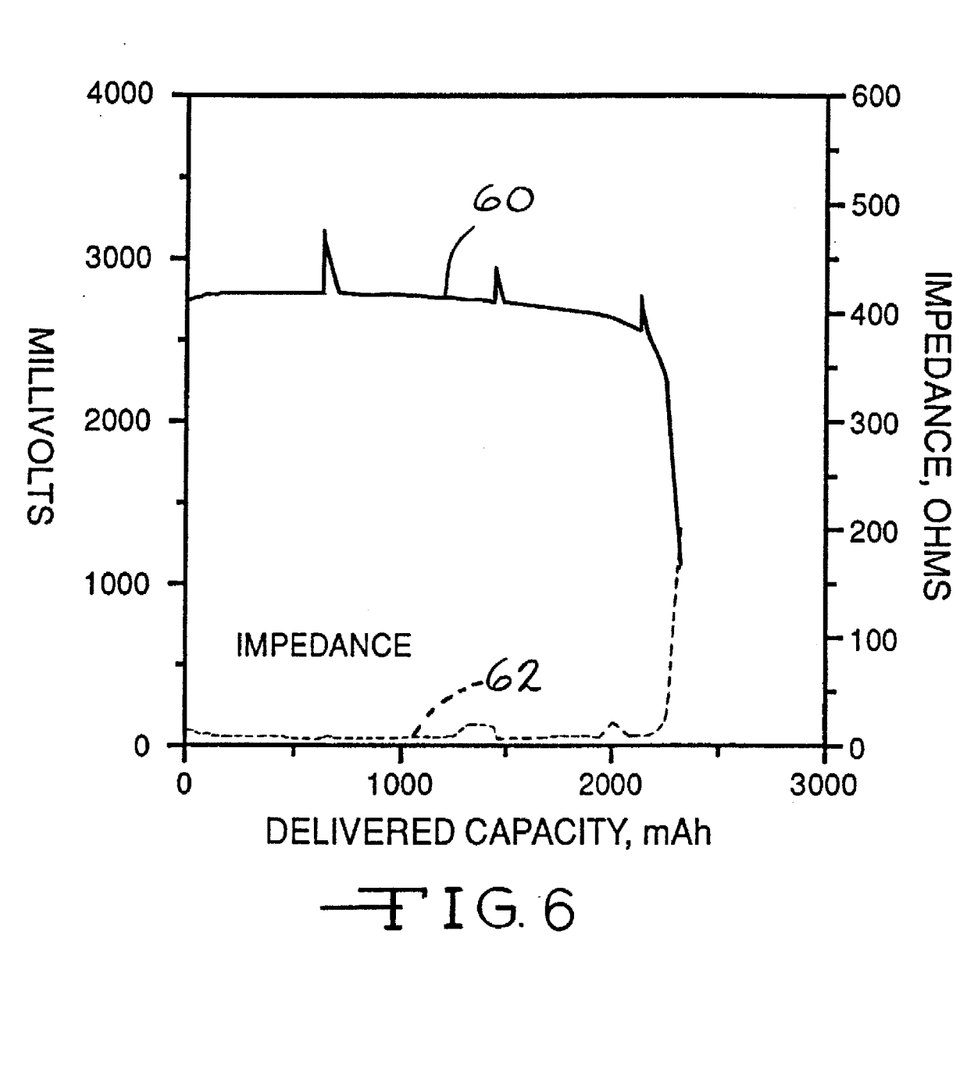
FIGS. 6 to 11 are graphs constructed from the average discharge of various Li/CF$_x$ test cell groups, each group consisting of three cells having various quantities of a first, 91% active CF$_x$ mixture contacting a titanium current collector and various quantities of either a second, 95% active C$_x$ mixture or a second, 98% active CF$_x$ mixture contacting the first active mixture.
Figure 7:
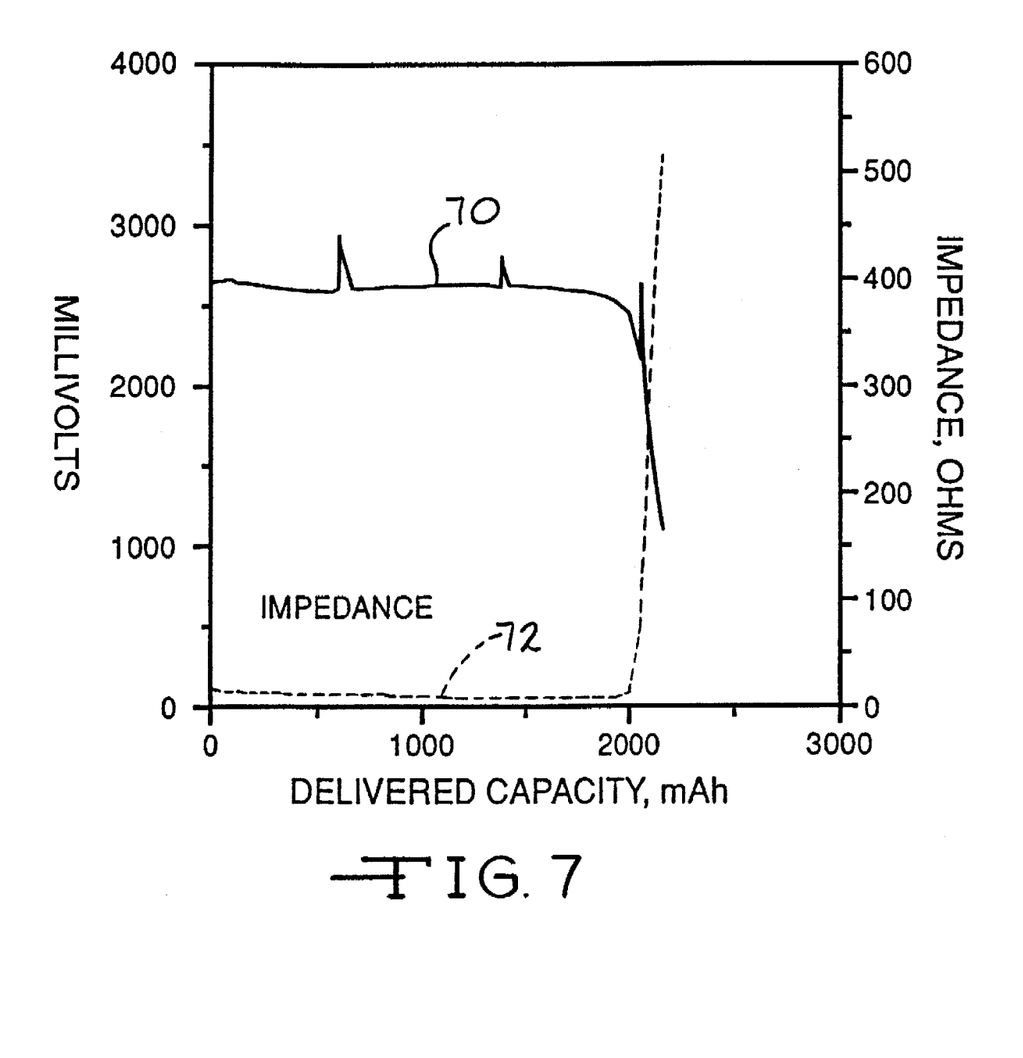
Figure 8:
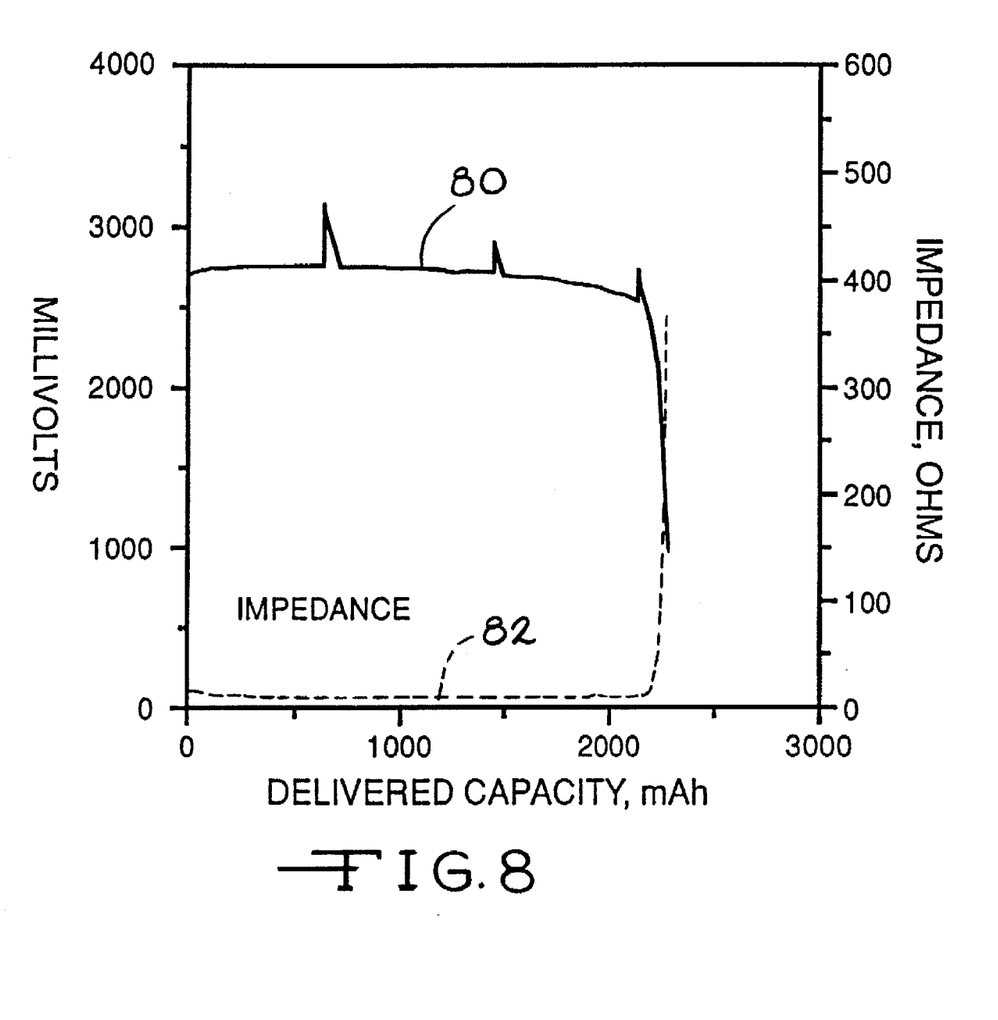
Figure 9:
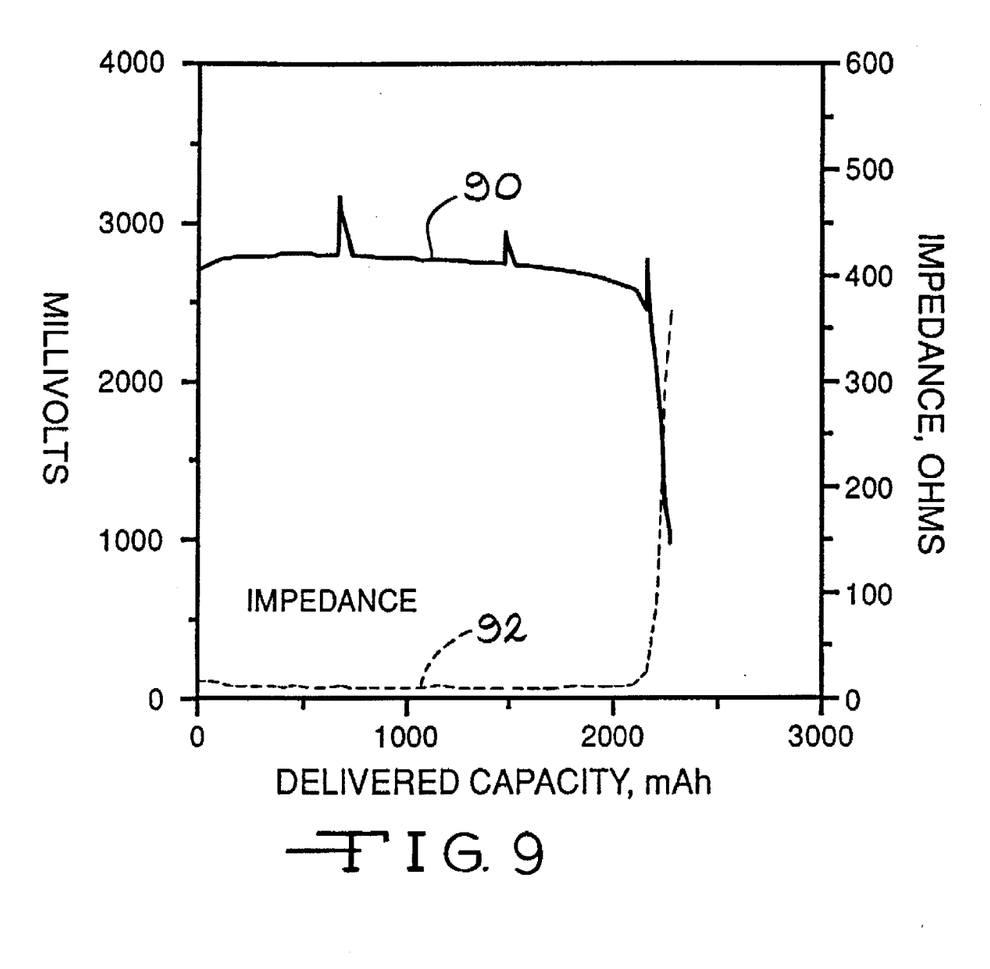
Figure 10:
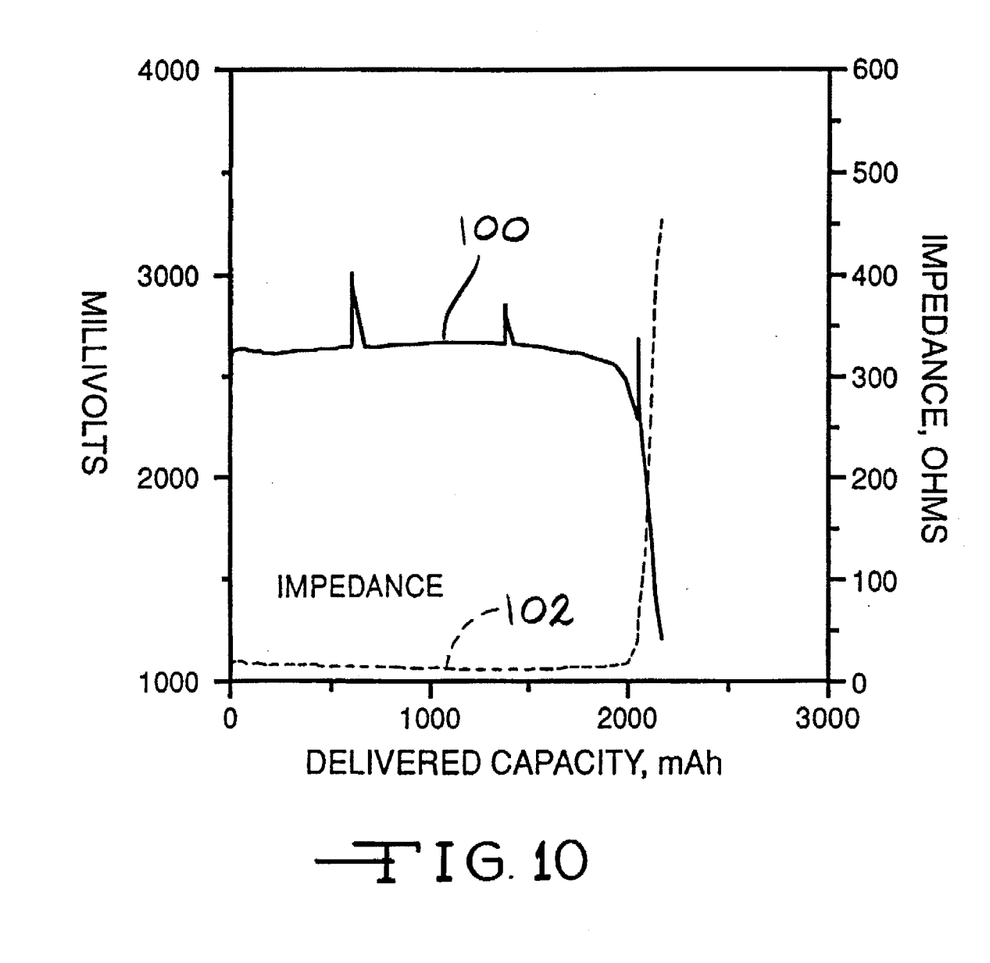
Figure 11:
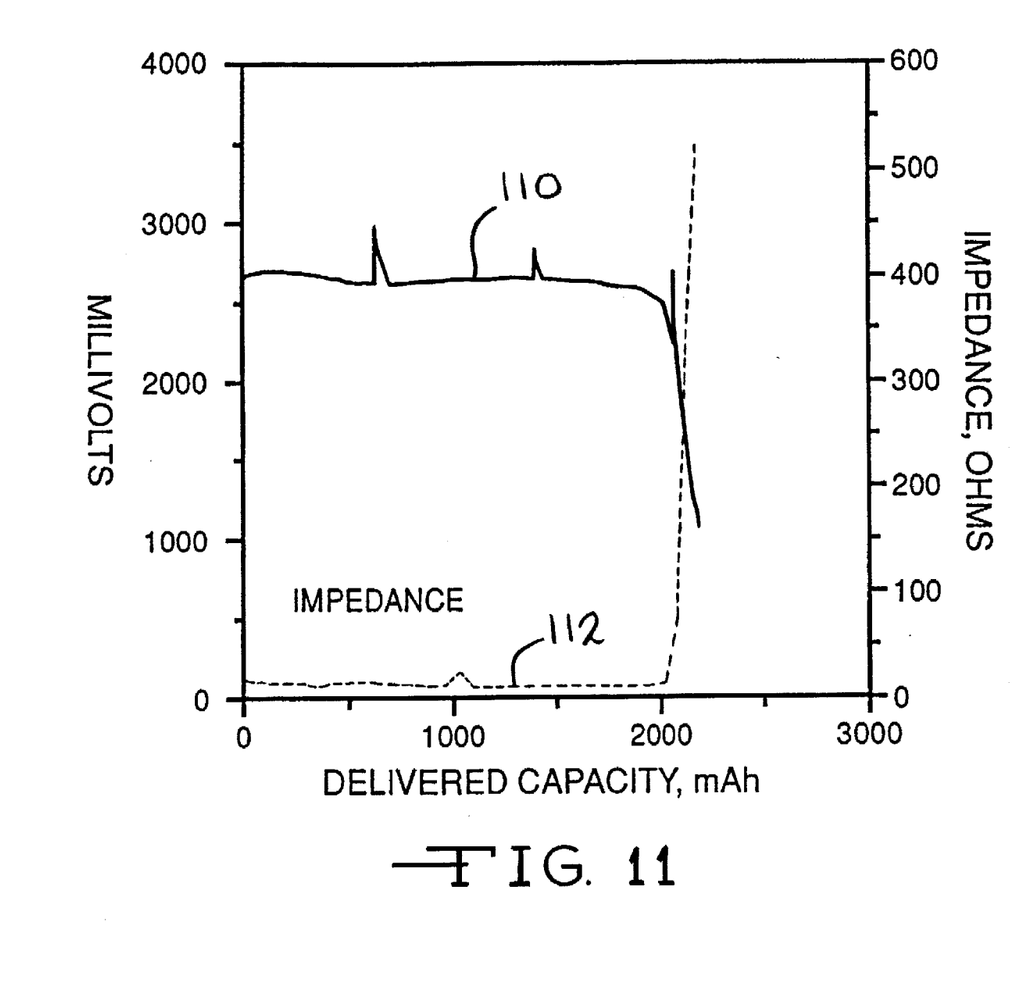

All of the cells in this example were preconditioned and then discharged according to a similar discharge protocol as that used to discharge the various cells constructed in Example I. The average discharge profiles of the cell groups in this example are shown in FIGS. 6 to 11, respectively. In FIG. 6 curve 60 was constructed from the average discharge of the sixth cell group having 0.6 grams of the 91% active $CF_x$ mixture contacted by 2.55 grams of the 95% active $CF_x$ mixture and curve 62 was constructed from the average impedance of this cell group. In FIG. 7, curve 70 was constructed from the average discharge of the seventh cell group having 0.6 grams of the 91% active $CF_x$ mixture contacted by 2.55 grams of the 98% active $CF_x$ mixture and curve 72 was constructed from the average impedance of this group of cells. In FIG. 8, curve 80 was constructed from the average discharge of the eighth cell group having 0.3 grams of the 91% active $CF_x$ mixture contacted by 2.85 grams of the 95% active $CF_x$ mixture and curve 82 was constructed from the average impedance of this group of cells. In FIG. 9, curve 90 was constructed from the average discharge of the ninth cell group having 0.3 grams of the 91% active $CF_x$ mixture contacted by 2.85 grams of the 98% active $CF_x$ mixture and curve 92 was constructed from the average impedance of this cell group. In FIG. 10, curve 100 was constructed from the average discharge of the tenth cell group having 0.9 grams of the 91% active $CF_x$ mixture contacted by 2.55 grams of the 95% active $CF_x$ mixture and curve 102 was constructed from the average impedance of this cell group. Finally, in FIG. 11, curve 110 was constructed from the average discharge of the eleventh cell group having 0.9 grams of the 91% active $CF_x$ mixture contacted by 2.55 grams of the 98% active $CF_x$ mixture and curve 112 was constructed from the average impedance of this cell group.

From Table 4 and FIGS. 6 to 11, it is readily apparent that the sixth group of cells in which 0.6 grams of the 91% active $CF_x$ mixture was placed in contact with the cathodic current collector and the remainder of the cathode (2.55 grams) consisted of the 95% active $CF_x$ mixture to give a total cathode weight of 3.15 grams electrically associated with a lithium anode having an excess of about 16% discharged most efficiently under the 1 K loads. These cells had an average delivered capacity of 2217±64 mAh to a 2V cutoff (FIG. 6), and delivered, on average, 37 mAh (or 1.7%) of additional capacity over cells built having 3.15 grams of the 95% active $CF_x$ mixture contacting the current collector (the second group of cells in Example I and FIG. 2). Based on the discharge voltages under a 1 K load, the gravimetric energy density of the cathode composition having the distinct active formulations, the first formulation contacting the current collector comprising 0.6 grams of the 91% active $CF_x$ formulation and the second formulation comprising the 95% active $CF_x$ mixture, is 1.95 Wh/g in comparison to 1.90 Wh/g for cathodes comprised entirely of the 95% active $CF_x$ formulations. The use of the mixed cathode formulations according to the present invention provides an increase of 0.05 Wh/g of cathode active material.

Similarly, it was found that cells in which 0.6 grams of the 91% active $CF_x$ mixture were placed in contact with each side of the cathodic current collector, the remainder of the cathode (2.55 grams) being the 98% active $CF_x$ mixture (FIG. 7), delivered additional capacity in comparison with cells having cathodes composed solely of the 98% active $CF_x$ mixture (the third group of cells in Example I and FIG. 3). Use of the mixed 91%/98% cathode formulations enabled those cells to deliver up to an average of 73 mAh or 3.7% of additional capacity in comparison to the cells constructed having only the 98% active $CF_x$ mixture.

It should be pointed out that while the above examples are directed to various $CF_x$ active formulations, according to the present invention, the use of at least two distinct active formulations with a greater amount of a discharge promoter component in the formulation contacting the current collector and a lesser amount of the discharge promoter component in the remainder of the electrode is equally applicable with the other enumerated cathode active materials. In that respect, distinct electrode active formulations according to the present invention are useful to increase the delivered capacity in a solid cathode/electrolyte system such as a Li/SVO cell, for example.

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
   (a) an anode;
   (b) a cathode comprising:
      i) a current collector;
      ii) a first active mixture contacting the current collector and comprising a first percentage of a first discharge promoter component mixed with at least one first electrode active material; and
      iii) a second active mixture contacting the first active mixture and comprising a second percentage of a second discharge promoter component mixed with at least one second electrode active material, wherein the first percentage of the first discharge promoter component is greater than the second percentage of the second discharge promoter component; and
   (c) an electrolyte activating and operatively associating the anode and the cathode.

2. The electrochemical cell of claim 1 wherein the first and second discharge promoter components are selected from the group consisting of graphite, carbon black, acetylene black and metallic powders selected from the group consisting of titanium, aluminum, nickel and stainless steel, and mixtures thereof.

3. The electrochemical cell of claim 1 wherein the first electrode active material in the first active mixture and the second electrode active material in the second active mixture are the same.

4. The electrochemical cell of claim 3 wherein the first and second electrode active materials are selected from the group consisting of manganese dioxide, copper silver vanadium oxide, copper vanadium oxide, silver vanadium oxide, titanium disulfide, copper oxide, copper sulfide, iron sulfide, iron disulfide and fluorinated carbon, and mixtures thereof.

5. The electrochemical cell of claim 1 wherein the first active mixture includes the first electrode active material in a range of between about 80% to about 94%, by weight, and the second electrode active mixture includes the second electrode active material in a range of between about 95% to about 98%, by weight.

6. The electrochemical cell of claim 1 wherein the first electrode active material is present in the first active mixture at about 91%, by weight, and the second electrode active material is present in the second electrode active mixture in a percentage greater than about 91%, by weight.

7. The electrochemical cell of claim 1 wherein the first electrode active material is a fluorinated carbon present in the first electrode active mixture at about 91%, by weight, and the second electrode active material is fluorinated carbon present in the second electrode active mixture at about 95%, by weight, or greater.

8. The electrochemical cell of claim 1 wherein the first and second electrode active materials are fluorinated carbon and wherein the first electrode active mixture includes about 91% fluorinated carbon and about 5% of the first discharge promoter component, by weight, and wherein the second electrode active mixture includes about 95% fluorinated carbon and about 4% of the second discharge promoter component, by weight.

9. The electrochemical cell of claim 8 wherein the first discharge promoter component is the same as the second discharge promoter component.

10. The electrochemical cell of claim 8 wherein the current collector is selected from the group consisting of titanium, aluminum, stainless steel and nickel, and mixtures thereof.

11. The electrochemical cell of claim 1 wherein the anode comprises an alkali metal.

12. The electrochemical cell of claim 11 wherein the anode contacts the casing in a case-negative configuration.

13. The electrochemical cell of claim 1 including a casing selected from the group consisting of nickel, titanium, stainless steel and aluminum, and mixtures thereof.

14. The electrochemical cell of claim 1 wherein the electrolyte solution operatively associated with the anode and the cathode comprises an ion-forming alkali metal salt dissolved in a nonaqueous solvent, and wherein the alkali metal of the salt is similar to the alkali metal comprising the anode.

15. The electrochemical cell of claim 14 wherein the alkali metal of the anode comprises lithium and the ion-forming alkali metal salt comprising the electrolyte solution is selected from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)_2$ and $LiCF_3SO_3$, and mixtures thereof.

16. The electrochemical of claim 14 wherein the nonaqueous solvent comprises an organic solvent selected from the group consisting of tetrahydrofuran, methyl acetate, diglyme, triglyme, acetonitrile, dimethyl sulfoxide, dimethyl formamide, dimethyl acetamide, diethyl carbonate, propylene carbonate, ethylene carbonate, tetraglyme, dimethyl carbonate, 1,2-dimethoxyethane, γ-butyrolacetone and N-methyl-pyrrolidinone and mixtures thereof.

17. A cathode for an electrochemical cell, the cathode comprising:
   a) a current collector;
   b) a first active mixture contacting the current collector and comprising a first percentage of a first discharge promoter component mixed with at least one first electrode active material; and
   c) a second active mixture contacting the first active mixture and comprising a second percentage of at least one second discharge promoter component mixed with a second electrode active material, wherein the first percentage of the first discharge promoter component is greater than the second percentage of the second discharge promoter component.

18. The cathode of claim 17 wherein the first and second discharge promoter components are selected from the group consisting of graphite, carbon black and acetylene black and metallic powders selected from the group consisting of titanium, aluminum, nickel and stainless steel, and mixtures thereof.

19. The cathode of claim 17 wherein the first electrode active material in the first active mixture and the second electrode active material in the second active mixture are the same.

20. The cathode of claim 17 wherein the first and second electrode active materials are selected from the group consisting of manganese dioxide, copper silver vanadium oxide, copper vanadium oxide, silver vanadium oxide, titanium disulfide, copper oxide, copper sulfide, iron sulfide, iron disulfide and fluorinated carbon, and mixtures thereof.

21. The cathode of claim 17 wherein the first active mixture includes the first electrode active material in a range of between about 80% to about 94%, by weight, and the second active mixture includes the second electrode active material in a range of between about 95% to about 98%, by weight.

22. The cathode of claim 17 wherein the first electrode active material is present in the first active mixture at about 91%, by weight, and the second electrode active material is present in the second electrode active mixture in a percentage greater than about 91%, by weight.

23. The cathode of claim 17 wherein the first and second electrode active materials are a fluorinated carbon and wherein the first electrode active mixture includes about 91% fluorinated carbon and about 5% of the first discharge promoter component, by weight, and wherein the second electrode active mixture includes about 95% fluorinated carbon and about 4% of the second discharge promoter component, by weight.

24. The cathode of claim 23 wherein the first and second discharge promoter components are the same.

25. The cathode of claim 17 wherein the current collector is selected from the group consisting of titanium, nickel, aluminum and stainless steel, and mixtures thereof.

26. A method of providing a cathode comprising the steps of:
   a) providing a current collector;
   b) preparing a first active mixture by mixing together a first percentage of a first discharge promoter component with at least one first electrode active material;
   c) preparing a second active mixture by mixing together a second percentage of a second discharge promoter component with at least one second electrode active material, wherein the first percentage of the first discharge promoter component is greater than the second percentage of the second discharge promoter component;
   d) contacting the current collector with the first active mixture; and
   e) contacting the first active mixture with the second active mixture.

27. The method of claim 26 including selecting the first and second discharge promoter components from the group consisting of graphite, carbon black and acetylene black and metallic powders selected from the group consisting of titanium, aluminum, nickel and stainless steel, and mixtures thereof.

28. The method of claim 26 including selecting the first and second electrode active materials from the group consisting of manganese dioxide, copper silver vanadium oxide, copper vanadium oxide, silver vanadium oxide, titanium disulfide, copper oxide, copper sulfide, iron sulfide, iron disulfide and fluorinated carbon, and mixtures thereof.

29. The method of claim 26 including preparing the first active mixture by mixing the first electrode active material in a range of between about 80% to about 94%, by weight, and preparing the second active mixture by mixing the second electrode active material in a range of between about 95% to about 98%, by weight.

30. The method of claim 26 including preparing the first active mixture by mixing about 91%, by weight, of the first electrode active material with the first discharge promoter component, and preparing the second active mixture by mixing greater than about 91%, by weight, of the second electrode active material with the second discharge promoter component.

31. The method of claim 26 including providing the first and second electrode active materials comprising both the first and the second active mixtures as fluorinated carbon, and wherein the first electrode active mixture includes about 91% fluorinated carbon and about 5% of the first discharge promoter component, by weight, and wherein the second electrode active mixture includes about 95% fluorinated carbon and about 4% of the second discharge promoter component, by weight.

32. The method of claim 26 including selecting the current collector from the group consisting of titanium, aluminum, stainless steel and nickel, and mixtures thereof.

33. A method of providing an electrochemical cell, comprising the steps of:
   a) providing a casing;
   b) providing an anode;
   c) providing a cathode current collector;
   d) preparing a first active mixture by mixing together a first percentage of a first discharge promoter component with at least one first electrode active material;
   e) preparing a second active mixture by mixing together a second percentage of a second discharge promoter component with at least one second electrode active material, and wherein the first percentage of the first discharge promoter component is greater than the second percentage of the second discharge promoter component;
   f) contacting the cathode current collector with the first active mixture;
   g) contacting the first active mixture with the second active mixture to thereby provide a cathode;
   h) operatively associating the anode with the cathode housed inside the casing with the anode and the cathode connected to respective terminals; and
   i) activating the anode and the cathode with an electrolyte filled into the casing.

34. The method of claim 33 including selecting the casing from the group consisting of titanium, nickel, stainless steel and aluminum and mixtures thereof.

35. The method of claim 33 including selecting the cathode current collector from the group consisting of titanium, nickel, stainless steel and aluminum and mixtures thereof.

36. The method of claim 33 including selecting the first and second electrode active materials from the group consisting of manganese dioxide, copper silver vanadium oxide, copper vanadium oxide, silver vanadium oxide, titanium disulfide, copper oxide, copper sulfide, iron sulfide, iron disulfide and fluorinated carbon, and mixtures thereof.

37. The method of claim 33 including preparing the first active mixture by mixing the electrode active material in a range of between about 80% to about 94%, by weight, with the first discharge promoter component, and preparing the second active mixture by mixing the second electrode active material in a range of between about 95% to about 98%, by weight, with the second discharge promoter component.

38. The method of claim 33 wherein the first and second electrode active materials are fluorinated carbon and including preparing the first active mixture by mixing about 91%, by weight, of the fluorinated carbon with the first discharge promoter component, and preparing the second active mixture by mixing the fluorinated carbon in a percentage greater than about 91%, by weight, with the second discharge promoter component.

39. The method of claim 33 including providing the first and second electrode active materials comprising both the first and the second active mixtures as fluorinated carbon, and wherein the first electrode active mixture includes about 91% fluorinated carbon and about 5% of the first discharge promoter component, by weight, and wherein the second electrode active mixture includes about 95% fluorinated carbon and about 4% of the second discharge promoter component, by weight.

40. The method of claim 33 including providing the electrolyte solution operatively associated with the anode and the cathode comprising an ion-forming alkali metal salt dissolved in a nonaqueous solvent, wherein the alkali metal of the salt is similar to an alkali metal comprising the anode.

41. The method of claim 40 including providing the alkali metal of the anode comprising lithium and selecting the ion-forming alkali metal salt comprising the electrolyte solution from the group consisting of $LiPF_6$, $LiAsF_6$, $LiSbF_6$ and $LiBF_4$, $LiClO_4$, $LiAlCl_4$, $LiGaCl_4$, $LiC(SO_2CF_3)_3$, $LiN(SO_2CF_3)_2$ and $LiCF_3SO_3$, and mixtures thereof.

42. The method of claim 40 including the nonaqueous solvent comprising an organic solvent selected from the group consisting of tetrahydrofuran, methyl acetate, diglyme, triglyme, diethyl carbonate, acetonitrile, dimethyl sulfoxide, dimethyl formamide, dimethyl acetamide, propylene carbonate, ethylene carbonate, tetraglyme, dimethyl carbonate, 1,2-dimethoxyethane, γ-butyrolactone and N-methyl-pyrrolidinone, and mixtures thereof.

43. The method of claim 33 including selecting the first and second discharge promoter components from the group consisting of graphite, carbon black and acetylene black and metallic powders selected from the group consisting of titanium, aluminum, nickel and stainless steel, and mixtures thereof.

* * * * *